(12) United States Patent
Seznec et al.

(10) Patent No.: US 7,139,903 B2
(45) Date of Patent: Nov. 21, 2006

(54) CONFLICT FREE PARALLEL READ ACCESS TO A BANK INTERLEAVED BRANCH PREDICTOR IN A PROCESSOR

(75) Inventors: Andre C. Seznec, Acigné (FR); Stephen Felix, Cambridge, MA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 636 days.

(21) Appl. No.: 09/740,419

(22) Filed: Dec. 19, 2000

(65) Prior Publication Data

US 2002/0078332 A1 Jun. 20, 2002

(51) Int. Cl.
G06F 9/42 (2006.01)
G06F 9/44 (2006.01)

(52) U.S. Cl. .................... 712/239; 712/240

(58) Field of Classification Search ........... 711/119, 711/216, 219, 213, 211, 209, 204, 153, 130, 711/173, 210; 712/239, 240, 236, 235
See application file for complete search history.

(56) References Cited

U.S. PATENT DOCUMENTS

| | | | | |
|---|---|---|---|---|
| 4,453,212 A | * | 6/1984 | Gaither et al. | 711/2 |
| 5,371,877 A | * | 12/1994 | Drako et al. | 711/109 |
| 5,664,137 A | * | 9/1997 | Abramson et al. | 712/216 |
| 5,752,259 A | * | 5/1998 | Tran | 711/125 |
| 5,875,324 A | * | 2/1999 | Tran et al. | 712/238 |
| 5,890,013 A | * | 3/1999 | Nair et al. | 710/53 |
| 6,101,577 A | * | 8/2000 | Tran | 711/125 |
| 6,550,004 B1 | * | 4/2003 | Henry et al. | 712/239 |

OTHER PUBLICATIONS

*Multiple-Block Ahead Branch predictors*, A. Seznec et al., ASPLOS VII Oct. 1996 MA, USA, 1996 ACM 0-89791-767-7/96/0010, pp. 116-127.

*Trace Cache: a Low Latency Approach to High Bandwidth Instruction Fetching*, E. Rotenberg et al., 1072-4451/96 1996 IEEE, pp. 24-34.

*Increasing the Instruction Fetch Rate via Multiple Branch Prediction and a Branch Address Cache*, T. Yeh et al., 1993 ACM 0-89791-600-X/93/0007/0067, pp. 67-76.

(Continued)

Primary Examiner—Daniel H. Pan (57) ABSTRACT

A computer system has a processor that has a prediction array that avoids conflicts when the prediction array is accessed twice in once clock cycle to retrieve predictions for two separate conditional branch instructions. The prediction array is included as part of a branch prediction logic circuit that includes a bank control logic coupled to the prediction array. The bank control logic assures the conflict noted above is avoided. The prediction array preferably comprises multiple (e.g., 4) single-ported bank memory elements, each bank comprising multiple predictions. The bank control logic uses information associated with a previously fetched and branch predicted conditional branch instruction to generate a bank number for a current branch instruction. The generated bank number corresponds to one of the banks in the prediction array. The processor preferably fetches two (or more) groups (also called "slots") of instructions each cycle. Each slot may include one or more branch instructions that need to be branch predicted. Thus, the branch prediction logic circuit first generates a bank number for one of the slots and then generates a bank number for the other slot and uses the bank numbers to retrieve predictions from the multi-bank, single ported prediction array. The bank control logic computes the bank numbers in a manner that assures that no two consecutively generated bank numbers are identical.

20 Claims, 4 Drawing Sheets

OTHER PUBLICATIONS

*Multiple Branch and Block Prediction*, S. Wallace et al., 1997 IEEE, Proceedings of the Third international Symposium on High Performance Computer Architecture, Feb. 1-5, 1997, pp. 1-10, plus cover sheet.

*Dynamic Path-Based Branch Correlation*, R. Nair, 1072-4451/95 1995 IEEE, pp. 15-23.

*Two-Level Adaptive Training Branch Prediction*, Tse-Yu Yeh et al., 1991 ACM 0-89791-460-9/91/0011/0051, pp. 51-61.

*Multiple-Block Ahead Branch Predictors*, A. Seznee et al., ASPLOS VIII Oct. 1996; 1996 ACM 0-89791-767-7/96/0010 (12 p.).

\* cited by examiner

CONFLICT FREE PARALLEL READ ACCESS TO A BANK INTERLEAVED BRANCH PREDICTOR IN A PROCESSOR

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

The present invention generally relates to prediction of conditional branch instructions in a microprocessor. Still more particularly, the invention relates to branch prediction in a processor that fetches more than one block of instructions at a time. More particularly still, the invention relates to branch prediction with bank interleaved prediction arrays.

2. Background of the Invention

A microprocessor comprises the logic, typically a semiconductor device, which executes software. Microprocessors thus fetch software instructions from memory and executes them. Each instruction generally undergoes several stages of processing. For example, the instruction must be fetched and decoded to determine the type of instruction (add, multiply, memory write, etc.). Then, the instruction is scheduled, executed and finally retired. Each stage of processing may take multiple clock cycles. It has been recognized that the next instruction to be executed by a processor can be fetched and entered into the processor's pipeline before the previous instruction is retired. Thus, some processors are designed with pipelined architectures to permit multiple instructions to be at various stages of processing at any one point in time. For example, while one instruction is being scheduled, the next instruction can be fetched and decoded. Moreover, as the pipeline increases in length with developments in microprocessor design, the processor can have more instructions at various stages of processing.

A computer programmer has a variety of different types of instructions at his or her disposal when writing software. One type of instruction is generically referred to as a "conditional branch" instruction. This instruction includes a condition that is checked and the condition can either be true or false. For example, the condition might be to check whether a certain error condition exists. The error condition either exists or not. If the error condition currently exists, the condition is true, otherwise the condition is false (i.e., the condition does not exist). Consequently, one set of instructions is executed if the condition is true, and another set of instructions is executed if the condition is false.

Each instruction is stored at a unique address in memory. Typically, if a conditional branch instruction checks a condition that turns out to be false, then program execution follows to the next instruction following the conditional branch instruction. If the condition is true, however, program execution generally jumps (also called "branches") to a different instruction and the processor continues executing from that instruction. Thus, the branch is either "taken" or "not taken" depending on whether the condition is true or not. If the condition is true, the branch is taken and the processor's instruction pointer (which contains the address of each instruction to be executed) is reloaded with a different address from the branch instruction to continue execution. If the condition is false, the branch is not taken and the instruction pointer is simply incremented so that processor continues execution with the instruction immediately following the conditional branch instruction.

In a pipelined architecture, instructions may be fetched to enter the pipeline before a previously fetched conditional branch instruction is actually executed. Accordingly, pipelined processors include branch prediction logic that predicts the outcome of branch instructions before the branch instructions are actually executed. The branch predictor logic thus predicts whether the branch is likely to be taken or not, and thus which instructions are to be fetched following the fetching of a conditional branch instruction. The branch predictor merely predicts the future outcome of the conditional branch instruction; the true outcome will not be accurately known until the branch instruction is actually executed. If the branch predictor turns out to have made the correct prediction, then instructions that must be executed are already in the pipeline. If the prediction turns out to have been inaccurate, then the incorrect instructions that had been fetched must be thrown out and the correct instructions fetched. Performance suffers on mispredictions. Choosing a branch prediction scheme that results in correct predictions much more often than mispredictions will result in higher performance.

Superscalar processors are increasingly executing more and more instructions in parallel. Therefore, more and more instructions must be fetched in parallel. Some processors fetch multiple blocks of instructions (i.e., a group of two or more instructions) at a time. The blocks of instructions may or may not be contiguous. Each block may contain one or more conditional branch instructions that must be predicted. Accordingly, there is a need to predict multiple branch instructions generally simultaneously (i.e., in the same clock cycle).

Most simple branch predictors include a table of counters. The prediction table typically includes multiple entries and each entry includes a prediction as to whether a conditional branch instruction will be taken or not. Once a conditional branch instruction is fetched, the address for that instruction is used to generate an index value which is then combined with history information regarding past branch outcomes. The resulting value is then used to point to one of the entries in the prediction table. As such, on encountering a conditional branch instruction in program flow, the table of counters is indexed for the given branch. The most significant bit of the counter at the indexed entry often is used as the prediction for the branch. A "1" may mean that the branch should be taken, while a "0" may mean that the branch should not be taken. The counter is updated ("trained") once the outcome of the branch is accurately known.

Various branch prediction schemes differ in the way the prediction table is indexed by a conditional branch instruction. For example, it has been suggested that for processors that fetch multiple blocks of instructions at a time, the indexing scheme should use a single function that considers the position of the branch instruction in the block of fetched instructions. That is, the position in the predictor table of the prediction associated with a particular branch instruction depends on the position of the branch in the block of instructions containing the branch. This type of indexing scheme leads to interference in the predictor tables. This means that two or more different branches may index the same entry in the table leading to some undesirable results whereby the various branches are predicted erroneously.

Another suggested indexing technique is to use information associated with a fetched block of instructions to predict the branches in the next fetched block. In this technique, the accessed entry in the predictor table does not depend on the position of the fetch block in the group of blocks fetched in parallel. However, the predictor tables must have multiple read ports to manage conflicts when the same entry in the table is being accessed as a result of predicting two different branch instructions. That is, the memory used to store the prediction table must be dual-ported. Multiple read ports undesirably add considerable complexity and significantly reduce useful storage capacity of the prediction table.

Accordingly, an improved branch prediction indexing scheme is needed for processors that can simultaneously fetch multiple blocks of instructions.

BRIEF SUMMARY OF THE INVENTION

The problems noted above are solved in large part by a computer system having a processor with a prediction array that avoids conflicts when the prediction array is accessed twice in one clock cycle to retrieve predictions for two separate conditional branch instructions. The prediction array is included as part of a branch prediction logic circuit in the processor and includes a bank control logic circuit coupled to the prediction array. The prediction array preferably comprises multiple (e.g., 4) single-ported bank memory elements, each bank comprising multiple predictions. The bank control logic assures that no two prediction array look ups access the same bank in the same clock cycle.

The bank control logic uses information associated with a previously fetched and predicted conditional branch instruction to generate a bank number for a current branch instruction. The generated bank number corresponds to one of the banks in the prediction array. The processor preferably fetches two (or more) groups (also called "slots") of instructions each cycle. Each slot may include one or more branch instructions that need to be predicted. Thus, the branch prediction logic circuit first generates a bank number for one of the slots and then generates a bank number for the other slot and uses the bank numbers to retrieve predictions from the multi-bank, single ported prediction array. The bank control logic computes the bank numbers in a manner that assures that the two bank numbers are different so that different banks are accessed. The preferred embodiment of the invention permits predictions for multiple branches for multiple slots to be retrieved from a branch prediction array in a single clock cycle without using dual ported memory. This and other advantages will become apparent upon reviewing the following disclosure.

BRIEF DESCRIPTION OF THE DRAWINGS

For a detailed description of the preferred embodiments of the invention, reference will now be made to the accompanying drawings in which.

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ". Also, the term "couple" or "couples" is intended to mean either an indirect or direct electrical connection. Thus, if a first device couples to a second device, that connection may be through a direct electrical connection, or through an indirect electrical connection via other devices and connections.

DETAILED DESCRIPTION OF THE PREFERRED EMBODIMENTS

Figure 1:
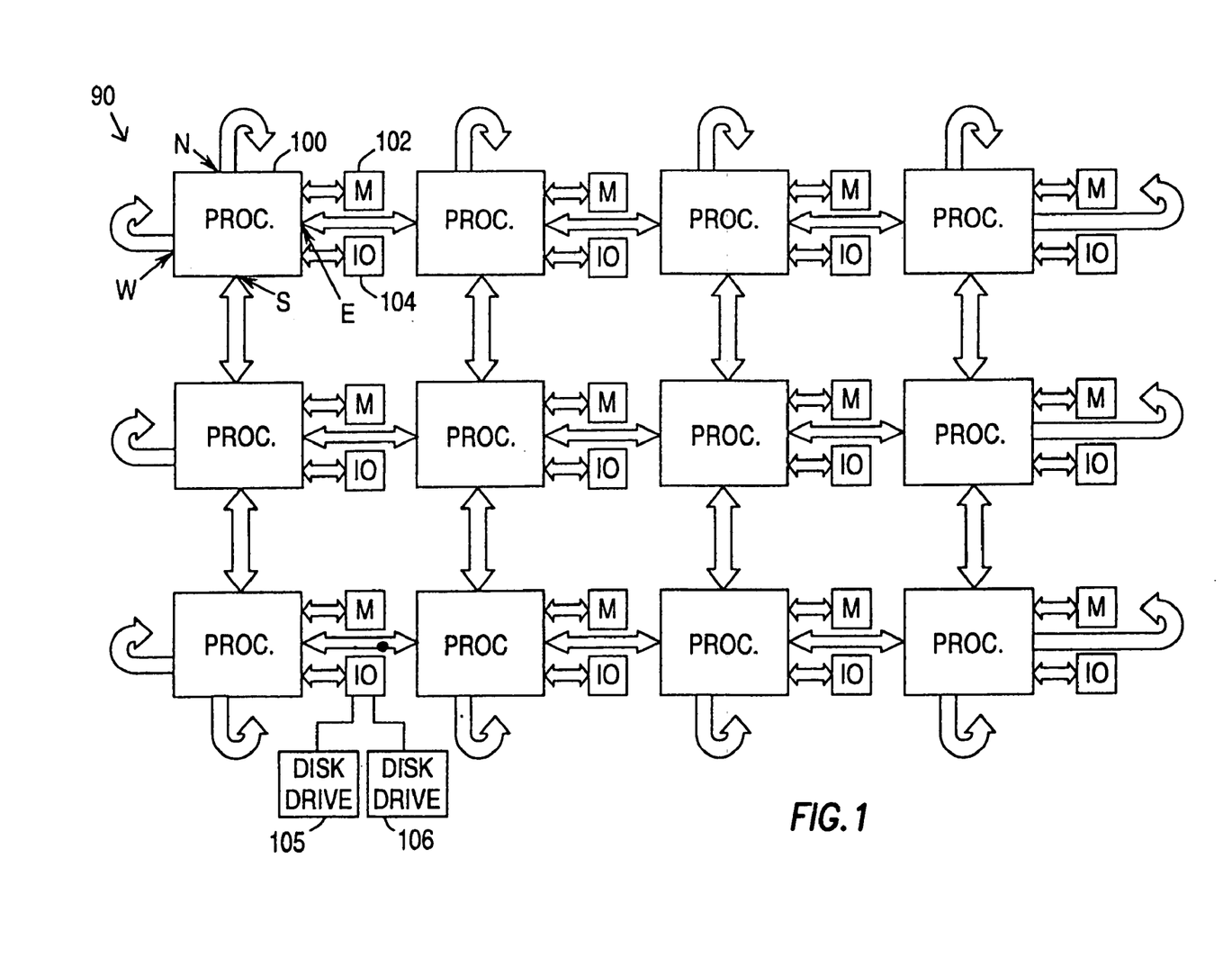
FIG. 1 shows a multi-processor computer system.

Referring now to FIG. 1, in accordance with the preferred embodiment of the invention, computer system 90 comprises one or more processors 100 coupled to a memory 102 and an input/output ("I/O") controller 104. As shown, computer system 90 includes 12 processors 100, each processor coupled to a memory and an I/O controller. Each processor preferably includes four ports for connection to adjacent processors. The inter-processor ports are designated "north," "south," "east," and "west" in accordance with the well-known Manhattan grid architecture. As such, each processor 100 can be connected to four other processors. The processors on both end of the system layout wrap around and connect to processors on the opposite side to implement a 2D torus-type connection. Although 12 processors 100 are shown in the exemplary embodiment of FIG. 1, any desired number of processors (e.g., 256) can be included.

The I/O controller 104 provides an interface to various input/output devices such as disk drives 105 and 106 as shown. Data from the I/O devices thus enters the 2D torus via the I/O controllers.

In accordance with the preferred embodiment, the memory 102 preferably comprises RAMBUS™ memory devices, but other types of memory devices can be used if desired. The capacity of the memory devices 102 can be any suitable size. Further, memory devices 102 preferably are implemented as RAMBUS Interface Memory Modules ("RIMMMS") and may include one or more memory modules as desired.

In general, computer system 90 can be configured so that any processor 100 can access its own memory 102 and I/O devices as well as the memory and I/O devices of all other processors in the network. Preferably, the computer system may have physical connections between each processor resulting in low interprocessor communication times and improved memory and I/O device access reliability. If physical connections are not present between each pair of processors, a pass-through or bypass path is preferably implemented in each processor that permits accesses to a processor's memory and I/O devices by another processor through one or more pass-through processors.

Figure 2:
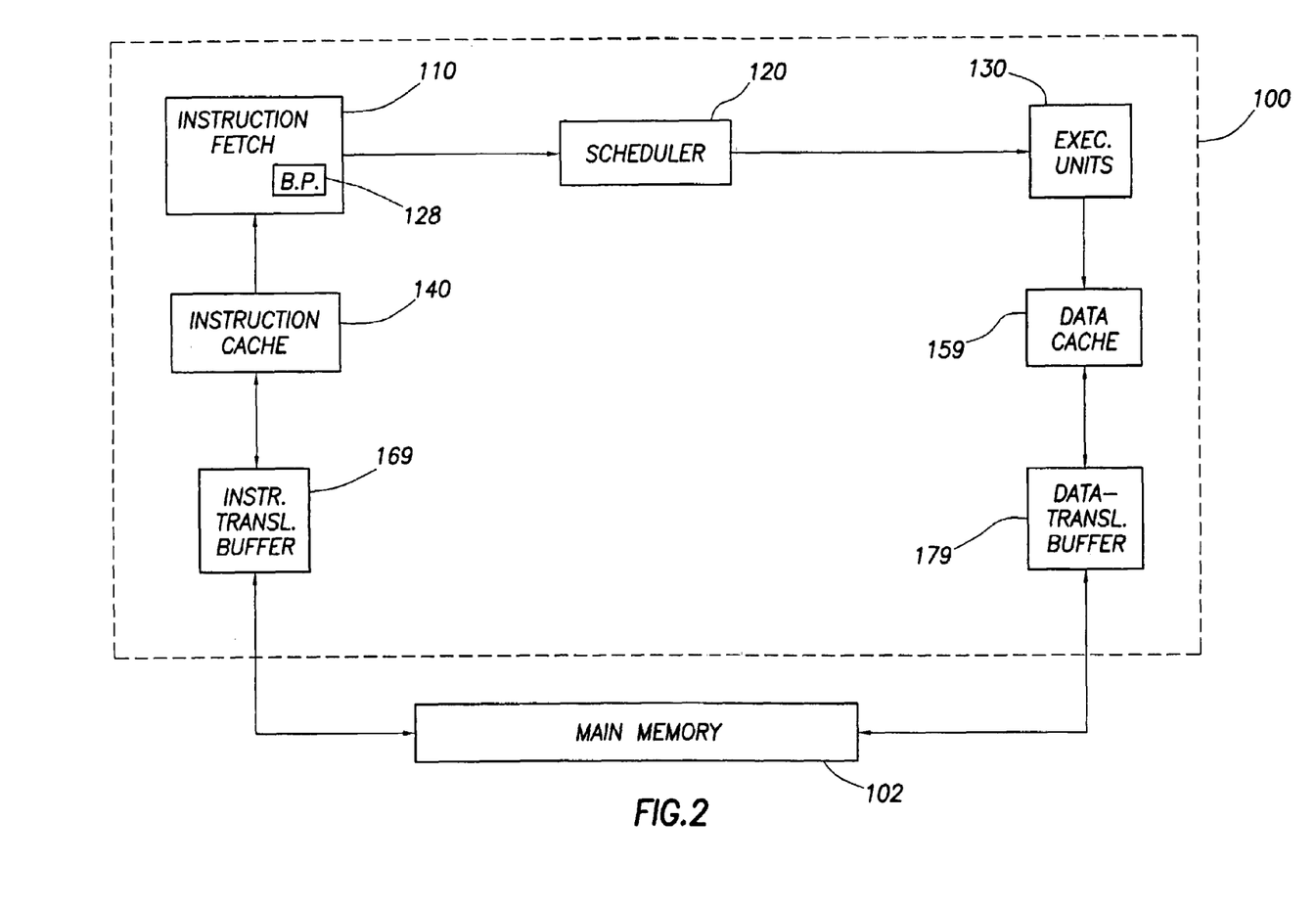
FIG. 2 shows a block diagram of a microprocessor that may be used in the computer system of FIG. 1 and including a branch predictor.

Referring to FIG. 2, each processor 100 preferably includes an instruction fetch 110, a scheduler 120, one or more execution units 130, an instruction cache 140, a data cache 159, and two translation buffers 169 and 179. The processor 100 is shown coupled to memory 102. Generally, the instruction fetch 110 fetches instructions from the instruction cache 140 and provides them to the scheduler 120 for scheduling. The instruction fetch 110 preferably produces an in-order stream of instructions to the scheduler 120. The instruction fetch 110 preferably is capable of fetching two blocks of instructions (also called "slots" of instructions) in each cycle. The instruction fetch generally fetches instructions, predicts branch instructions, and delivers the instructions to the scheduler 120. The scheduler may decide to provide the instructions out of order to the execution units 130. If the instruction reference is not found in the instruction cache 140, a virtual-to-physical address translation is performed using translation buffer 169. Translation buffer 169 thus comprises an instruction translation buffer and translates virtual addresses for instructions to physical addresses which are used to retrieve the desired instructions from memory 102.

The execution units may include floating point and integer execution units and are used, as the name implies, to execute instructions from the scheduler 120. If available, data required by an instruction is retrieved from the data cache 159. If the data cache 159 does not contain the data needed by the instruction, a virtual-to-physical address translation is performed using translation buffer 179. Translation buffer 179 thus comprises a data translation buffer and translates virtual addresses for data references to physical addresses which are then used to reference the desired data in memory 102.

Figure 3:
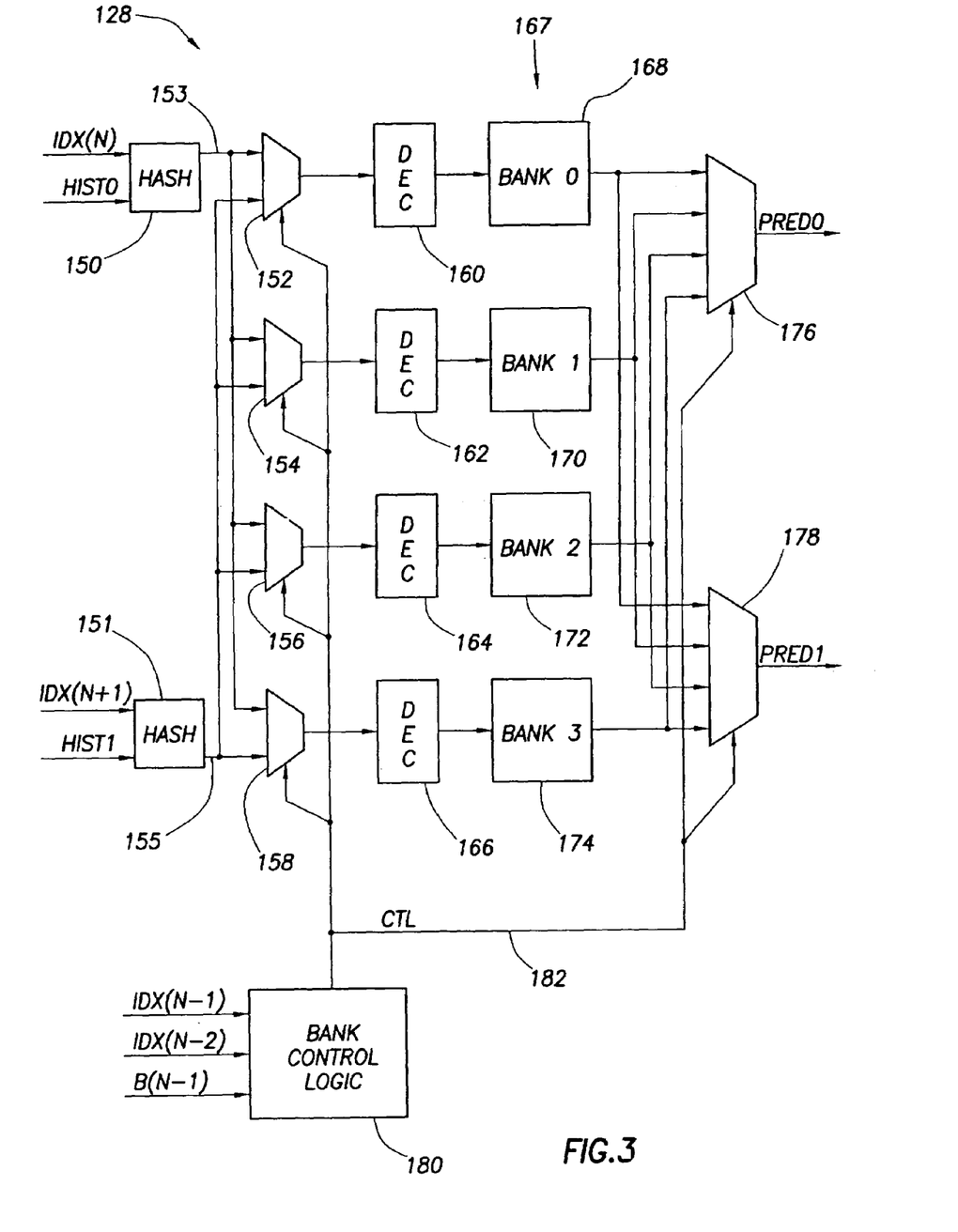
FIG. 3 shows a detailed block diagram of the branch predictor of FIG. 2.

The instruction fetch 110 includes various functional units, such as a branch predictor 128, which is shown in greater detail in FIG. 3. The branch predictor 128 predicts conditional branch instruction outcomes for the processor 100. Its predictions are either to take the branch or not. As noted above, the instruction fetch 110 preferably fetches two, or more if desired, slots of instructions each cycle. Each slot comprises eight instructions, although that number can be varied as desired. Any one or more of the eight instructions per slot may be a conditional branch instruction which must be predicted. As such, the branch predictor 128 may predict two branch instructions as taken and any number as not taken in the same cycle (up to the number of instructions in the slots). As noted previously, predicting a branch instruction generally requires using the branch instruction to index a prediction array and retrieving a prediction from the array at the location determined by the index value. The preferred embodiment of branch predictor 128 does not include dual-ported memory array in which to store its predictions. Instead, the branch predictor 128 includes logic that guarantees that the same bank in the prediction array is not accessed simultaneously for branches in both slots.

In accordance with the preferred embodiment of the invention, the branch predictor 128 includes a single-ported prediction array that is divided into two or more single-ported banks. The branch predictor 128 further includes logic to ensure that different banks are accessed for each group of branch predictions. The structure to support the preferred embodiment is shown in FIG. 3. As shown, the branch predictor 128 preferably includes hash units 150 and 151, multiplexers 152, 154, 156, 158, 176, and 178, decode logic units 160, 162, 164, and 166, bank prediction array 167, and bank control logic 180. The bank prediction array 167 preferably comprises four, single-ported banks 168, 170, 172, 174, also labeled as Bank0, Bank1, Bank2, and Bank3. Each bank 168–174 comprises storage for a suitable number of predictions (e.g., eight). Each bank has an associated decode logic 160–166 coupled to it and a multiplexer 152–158 coupled to the corresponding decode logic 160–166. The decode logic 160–166 receives signals from the corresponding multiplexers 152–158 and generates appropriate signals (e.g., row and column signals) to access the desired entry in the associate bank 168–174.

Hash units 150, 151 couple to each of the multiplexers 152–158. Predictions from the banks 168–174 are provided to 4-to-1 multiplexers 176, 178. The multiplexers 152–158, 176, and 178 are controlled by bank control logic 180 via a control ("CTL") set of signals 182. The bank control logic 180 assures that two branch instructions index different banks in the same cycle.

Figure 4:
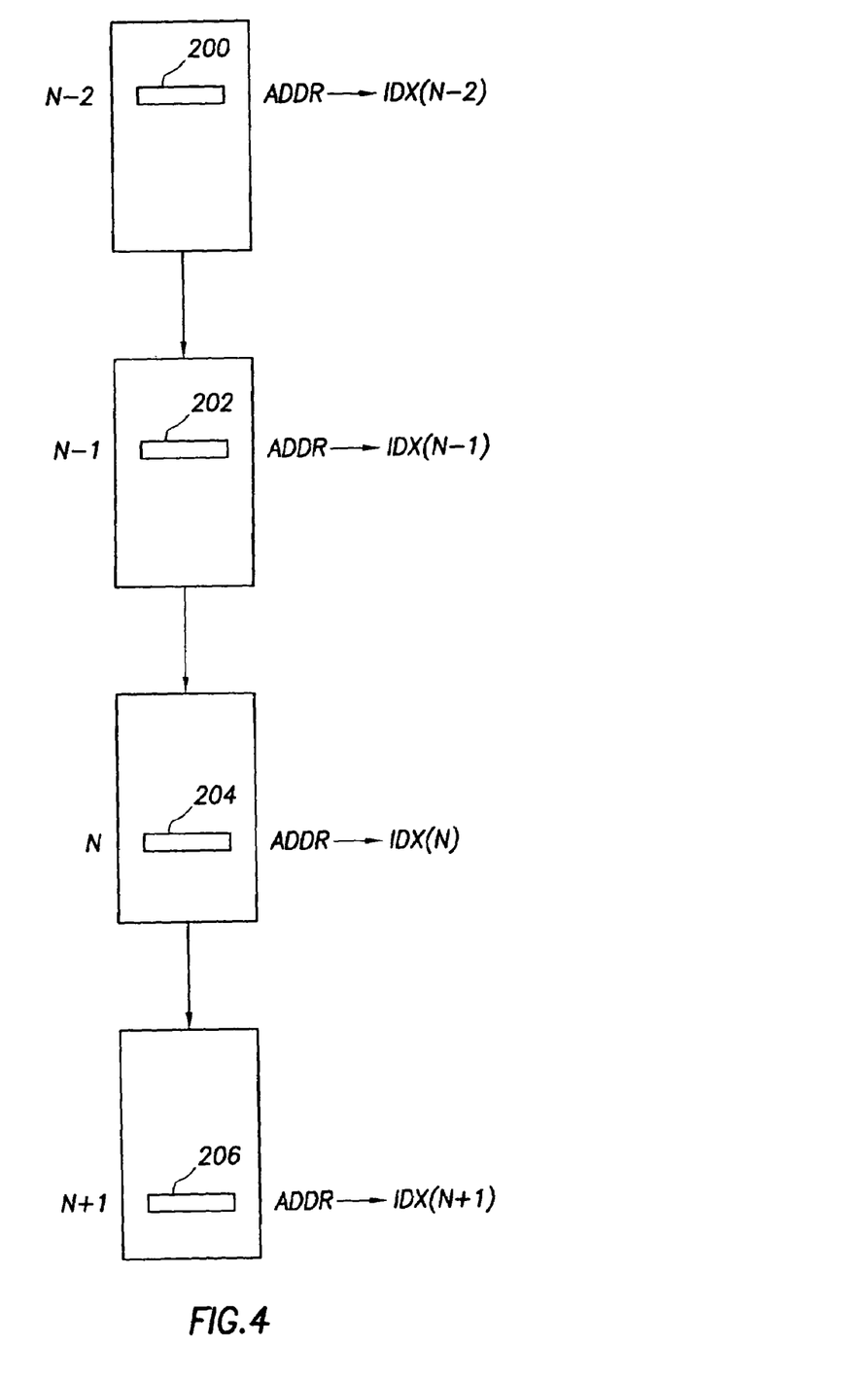
FIG. 4 shows four instruction blocks containing branch instructions.

To understand how the bank control logic 180 performs this function, reference will now be made to FIG. 4 to define some terms. FIG. 4 shows four consecutively fetched slots of instructions each having at least one branch instruction. The slots are labeled as N−2, N−1, N and N+1. These slots may or may not be contiguously located in memory. As shown, each slot N−2 through N+1 has a branch instruction 200, 202, 204, and 206 as shown, although a slot may have additional branch instructions as well. Each branch instruction 200–206 has a corresponding address. Each address comprises a predefined number of bits (e.g., 64). A subset of the address bits is called an "index." The indices for the addresses associated with branches 200–206 are shown as IDX(n−2), IDX(n−1), IDX(n), and IDX(n+1), respectively. Any suitable technique for determining which address bits to use as the index values is acceptable. In accordance with the preferred embodiment, each index value comprises the least significant 15 bits of the corresponding address. For example, IDX(n) is the least significant 15 bits of the address corresponding to branch instruction 204. By way of nomenclature, the 15 index value bits will be referred to as IDX(n)[14:0]. Two bits in particular of the index will be repeatedly referred to below, for reasons that will become apparent shortly. Those two bits are bits 5 and 6 of the index and will be referred to as, for example, IDX(n−1)[6,5].

Branch predictor 128 generally uses the index values to compute a bank number. The bank numbers preferably span the range of 0 to 3 corresponding to bank0–bank3. Once a bank number is computed for a branch instruction from a given slot, the bank corresponding to that bank number is used from which to fetch an branch prediction. The preferred embodiment of the branch predictor 128 will be explained for computing bank numbers for slots N and N+1, which simply represent two consecutively fetched slots with branch instructions in a series of such slots.

Referring again to FIG. 3, hash units 150, 151 receive the IDX(n) value and local or global history information (HIST0) from previous branch instructions. Similarly, hash unit 151 receives the IDX(n+1) value and history information (HIST1). The history information (HIST0 and HIST1) represent information related to previous branch instructions. It has been shown that using the past behavior of branch instructions often is helpful to predicting future branch instructions. The history information is maintained in tables and provided to the hash units 150, 151.

Each hash unit merges the index and history bits together in a suitable manner to produce index pointers 153 and 155, respectively. Each index pointer value 153, 155 can index a particular entry in any of the banks 168–174. The selection as to which particular bank an index pointer value 153, 155 will access is determined by multiplexer 152–158 under control by bank control logic 180.

The bank control logic 180 receives index values which correspond to the index values associated with the two previous slots, N−1 and N−2. The index values preferably are a portion of the address bits of a branch instruction as noted above. Those index values include IDX(n−1) and IDX(n−2). The bank control logic 180 also or receives the bank number corresponding to slot N−1. That bank number is shown in FIG. 3 as B(n−1). Alternatively, B(n−1) may have previously been calculated by the bank control logic 180 and retained for use in computing bank numbers for slots N and N+1.

The bank control logic 180 processes IDX(n−1), IDX(n−2) and B(n−1) and determines bank numbers for slots N and N+1. The bank number for slot N will be referred to as B(n) and the bank number for slot N+1 will be referred to as B(N+1). Bank control logic 180 computes B(n) and B(n+1) in such a way that B(n) does not equal B(n+1). As such, the branch predictor 128 can use single-ported memory elements as its prediction array and avoid conflicts whereby the same bank is trying to be accessed on behalf of two branch instructions.

Any suitable technique for ensuring B(n) does not equal B(n+1) is acceptable. One exemplary technique is as follows. In accordance with the preferred embodiment, bank control logic 180 implements the following logic for computing B(n):

$$B(n)=IDX(n-2)[6,5], \text{ if } IDX(n-2)[6,5] \neq B(n-1) \text{ else,}$$
$$B(n)=IDX(n-2)[6,5]+1$$

In other words, B(n) equals the value of bits 5 and 6 of the index value associated with slot N−2 as long as the value of bits 5 and 6 do not equal to the bank number of the previous slot, N−1. If, on the other hand, the value of bits 5 and 6 of slot N−2 equals the bank number associated with slot N−1 then the bank control logic 180 increments the value of bits 5 and 6 by one to force the bank number determined for the current slot, N, to be different than the bank number of the previous slot. In incrementing the value of bits 5 and 6, a value of "11" becomes "00". That is, 2 wraps around to 0.

Although bits 5 and 6 are preferred, any suitable bits in the index values can be used instead. Further, two bits from the index have been selected because, with two bits, four different values are possible (00, 01, 10, and 11) and there are four banks 168–174. If the bank prediction array 167 includes more than four banks, more than two index value bits may need to be processed by bank control logic 180.

The logic implemented in bank control logic 180 for determining the bank number for slot N+1 is:

$$B(n+1)=IDX(n-1)[6,5], \text{ if } IDX(n-1)[6,5] \neq B(n) \text{ else,}$$
$$B(n+1) \text{ } IDX(n-1)[6,5]+1$$

Once the bank control logic 180 determines a bank number for a slot, the bank control logic 180 directs the index pointer 153, 155 to the bank number by controlling the appropriate one of the multiplexers 152–158 and multiplexers 176 and 178 to select the appropriate prediction result, PRED0 or PRED1.

The logic described above for computing a bank number is exemplary only of one embodiment of the invention. Other logic techniques for assuring no bank conflict are possible as well. For example, rather than incrementing the index bits to avoid a conflict, the value of the bits could be decremented or changed in some other predetermined or random manner to a different value.

As described above, the branch predictor 128 in processor 100 includes a multi-bank, single-ported prediction array that permits two simultaneous prediction lookups without a conflict. Logic in the branch predictor assures that there is no conflict. The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A computer system, comprising:
   a processor;
   a system memory coupled to said processor; and
   an input device coupled to said processor;
   said processor having a branch predictor, said branch predictor includes a multi-bank prediction array that is used for predictions for conditional branch instructions, each of said banks comprising a single-ported memory device;
   said branch predictor also including bank control logic unit coupled to said prediction array to ensure that two accesses to said prediction array in the same cycle do not conflict, wherein each of said banks has an identifier and said bank control logic unit determines a bank identifier for a conditional branch instruction that is different than the bank identifier determined for a conditional branch instruction that was last used to access said prediction array.

2. The computer system of claim 1 wherein said processor further includes fetch logic unit that fetches two slots of instructions in one cycle.

3. The computer system of claim 1 wherein said branch predictor further includes a multiplexer coupled to each of said single-ported banks and controlled by said bank control logic unit.

4. The computer system of claim 3 wherein said branch predictor further includes a pair of 4-to-1 multiplexers that receive output signals each of said single-ported banks, said pair of multiplexers are controlled by said bank control logic unit.

5. The computer system of claim 1 wherein said branch predictor determines an index value based on a conditional branch instruction and uses said index value to retrieve a prediction from said prediction array.

6. The computer system of claim 5 wherein said bank control logic unit selects two bits from said index value to be a bank number.

7. The computer system of claim 5 wherein said bank control logic unit selects two bits from said index value to be a bank number if the value of said two bits does not equal a bank number determined for a conditional branch instruction that was last used to access said prediction array.

8. The computer system of claim 7 wherein, if said two bits equals said bank number determined for a conditional branch instruction that was last used to access said prediction array, then said bank control logic unit changes the values of said two bits and uses the changed value as a bank number.

9. The computer system of claim 8 wherein said bank control logic unit changes the value of said two bits by incrementing the value of said two bits.

10. The computer system of claim 1 wherein said processor further includes fetch logic unit that fetches at least two slots of instructions in one cycle.

11. A processor, comprising:
    a multi-bank prediction array used to predict conditional branch instructions, each of said banks comprising a single-ported memory device; and
    bank control logic unit coupled to said prediction array to ensure that two branch prediction accesses to said prediction array in the same cycle do not conflict, wherein said branch predictor determines an index value based on a conditional branch instruction and uses said index value to retrieve a prediction from said prediction array, and each of said banks has an identifier and said bank control logic unit determines a bank identifier for a conditional branch instruction that is different than the bank identifier determined for a conditional branch instruction that was last used to access said prediction array.

12. The processor of claim 11 wherein said processor further includes fetch logic unit that fetches two slots of instructions in one cycle.

13. The processor of claim 11 wherein said branch predictor further includes a multiplexer coupled to each of said single-ported banks and controlled by said bank control logic unit.

14. The processor of claim 13 wherein said branch predictor further includes a pair of 4-to-1 multiplexers that receive output signals each of said single-ported banks, said pair of multiplexers are controlled by said bank control logic unit.

15. The processor of claim 11 wherein said bank control logic unit selects two bits from said index value to be a bank identifier.

16. The processor of claim 11 wherein said bank control logic unit selects two bits from said index value to be a bank number if the value of said two bits does not equal a bank identifier determined for a conditional branch instruction that was last used to access said prediction array.

17. The processor of claim 16 wherein, if said two bits equals said bank identifier determined for a conditional branch instruction that was last used to access said prediction array, then said bank control logic unit changes the values of said two bits and uses the changed value as a bank identifier.

18. The processor of claim 17 wherein said bank control logic unit changes the value of said two bits by incrementing the value of said two bits.

19. A method of avoiding bank conflicts in a multi-bank prediction array in a processor, comprising:
generating an index value from a conditional branch instruction address;
selecting two bits from said index value;
comparing the value of said two bits with a previous bank number determined for a conditional branch instruction previously used to access said multi-bank prediction array;
using the value of said two bits as a current bank number if said value of said bits differs from said previous bank number;
if said value of said two bits equals said previous bank number, changing the value of said two bits to be the current bank number corresponding to a bank of said multi-bank prediction array; and
using said current bank number to access the corresponding bank in said multi-bank prediction array to retrieve a prediction.

20. The method of claim 19 wherein changing the value of said two bits comprises incrementing the value of said two bits.

* * * * *

UNITED STATES PATENT AND TRADEMARK OFFICE
CERTIFICATE OF CORRECTION

PATENT NO. : 7,139,903 B2  Page 1 of 1
APPLICATION NO. : 09/740419
DATED : November 21, 2006
INVENTOR(S) : Andre C. Seznec et al.

It is certified that error appears in the above-identified patent and that said Letters Patent is hereby corrected as shown below:

In column 2, line 3, after "that" insert -- the --.

In column 4, line 47, delete "("RIMMMS")" and insert -- ("RIMMS") --, therefor.

In column 7, line 44, after "if" insert -- = --.

In column 7, line 45, insert -- = -- before "IDX".

Signed and Sealed this

Fourteenth Day of July, 2009

JOHN DOLL
*Acting Director of the United States Patent and Trademark Office*